United States Patent [19]

Hullein et al.

[11] Patent Number: 4,639,129

[45] Date of Patent: Jan. 27, 1987

[54] METHOD OF MEASURING DISTANCE BETWEEN TWO OBSERVATION POINTS

[75] Inventors: Francois Hullein; Gérard Fribault, both of Nantes, France

[73] Assignee: Societe d'Etudes, Recherche et Constructions Electroniques-Sercel, Carquefou, France

[21] Appl. No.: 676,887

[22] Filed: Nov. 30, 1984

[30] Foreign Application Priority Data

Dec. 1, 1983 [FR] France .................................. 83 19234

[51] Int. Cl.$^4$ ................................................ G01C 3/08
[52] U.S. Cl. ..................................... 356/5; 340/870.29
[58] Field of Search .............................. 367/901; 356/5; 340/870.01, 870.28, 870.29

[56] References Cited

U.S. PATENT DOCUMENTS

| | | | |
|---|---|---|---|
| 3,714,654 | 1/1973 | Wicks et al. | 343/5 DP |
| 3,723,951 | 3/1973 | Kush, Jr. et al. | 367/901 |
| 4,146,328 | 3/1979 | Hullein et al. | 356/5 |
| 4,453,223 | 6/1984 | Ravel | 364/517 |

Primary Examiner—L. T. Hix
Assistant Examiner—David McGray
Attorney, Agent, or Firm—Fleit, Jacobson, Cohn & Price

[57] ABSTRACT

The present invention relates to a telemeter and to a method of determining the distance separating two points. The method comprises the steps consisting in (a) comparing the phase ($\phi$) of the modulation of an emission signal and of a received returned modulated signal (16), (b) in generating a signal representative of the value of the instantaneous variance ($V(\phi_i)$) of the phase samples ($\phi_i$) (107), (c) in generating an estimation of the phase on the basis of a signal derived from the average ($\hat{\phi}_E$) of n phase samples ($\phi_i$) which have been weighted by their instantaneous variance, (d) in generating a signal representative of the value of the distance (D) on the basis of the estimated phase value ($\hat{\phi}_E$), and (e) in displaying said value of the distance.

30 Claims, 5 Drawing Figures

FIG_1

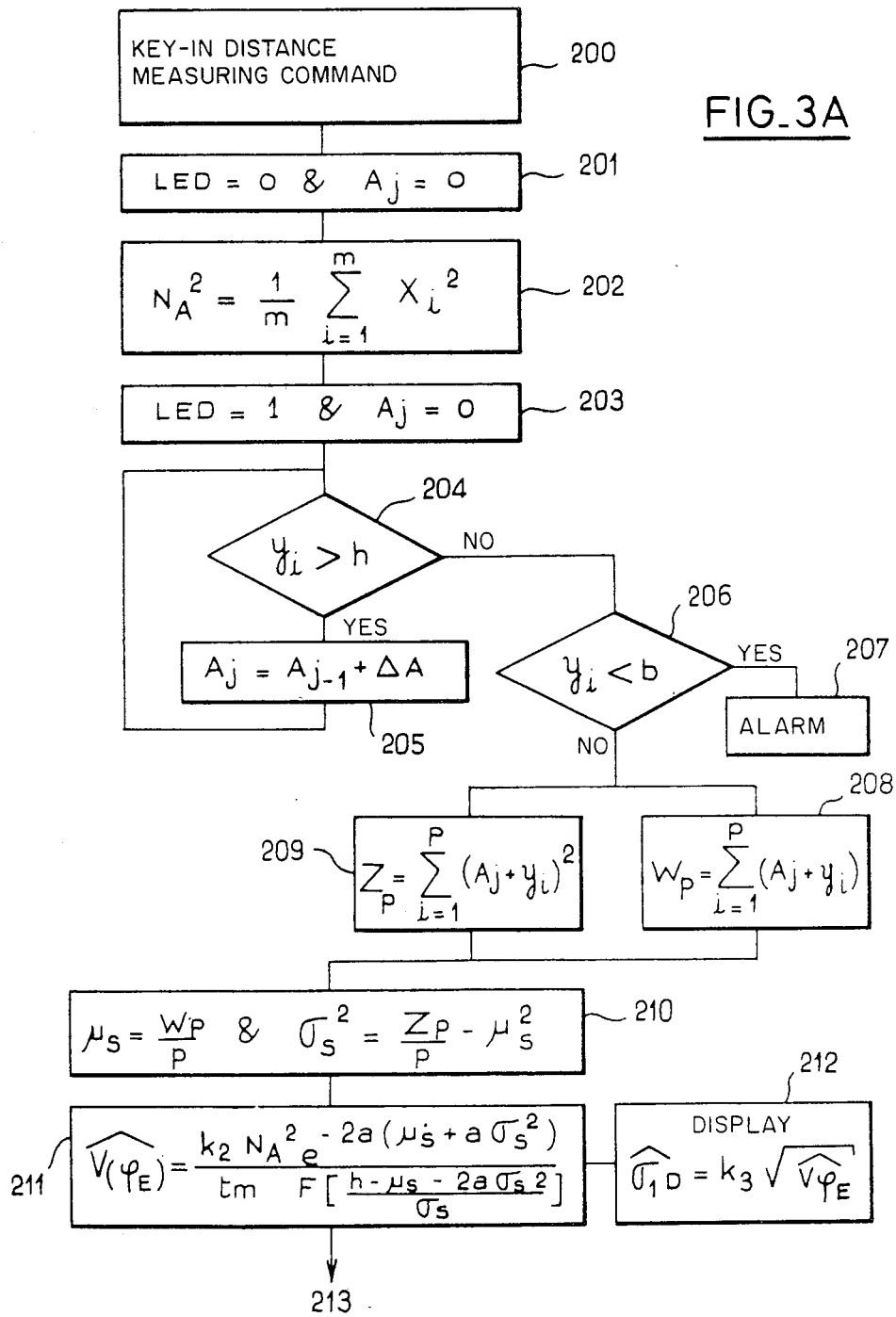
FIG_3A

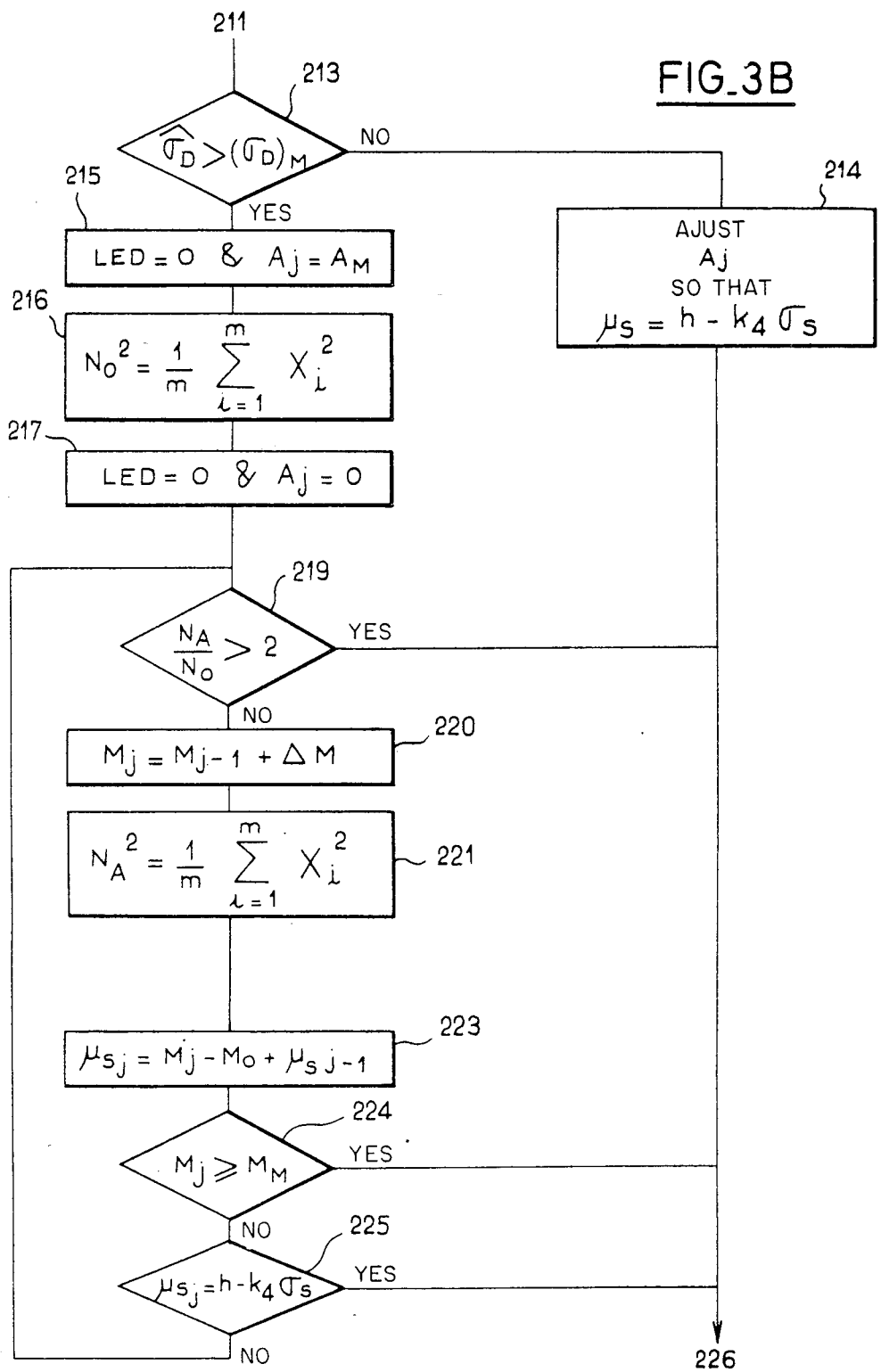

METHOD OF MEASURING DISTANCE BETWEEN TWO OBSERVATION POINTS

The invention relates to telemeters, i.e. to apparatuses for measuring distance by means of the go-and-return propagation time of a signal between two observation points.

The invention relates more particularly to a method of measuring distance and to a telemeter implementing the method. They are adapted to turbulance in the propagation medium.

BACKGROUND OF THE INVENTION

FIG. 1 is a diagram of a conventional optical telemeter.

As shown in FIG. 1 many current optoelectronic telemeters use a light emitting diode (LED) 1 disposed at a first observation point and associated with a modulator 2 controlled by a high frequency oscillator 3 operating at a frequency $F_T$ which is preferably several MHz, e.g. 15 MHz. The LED is disposed at the focus of a first lens 4 to emit an infrared light signal which is amplitude modulated at the frequency of the high frequency signal generated by the oscillator 3. The light signal is in the form of a thin beam which is thus capable of propagating a considerable distance.

A trihedral reflector 5 disposed at a second observation point returns the beam parallel to itself in a symmetical arrangement whose center is very close to the vertex of the reflector 5, and the returned beam is focused by a receive lens 6 adjacent to the above-mentioned send lens 4.

A photodiode is located at the focus of the second lens 6, and in general the photodiode will be of the avalanche type (APD). It feeds a signal to an amplifier stage 8 which delivers an electrical output signal which is modulated and phase shifted by an angle $\phi$ relative to the send modulation signal. The angle $\phi$ is related to the propagation time of the signal by the following equation:

$$\phi = \frac{4\pi F_T D}{c}, \quad (1)$$

in which:

$F_T$ is the frequency at which the LED 1 is modulated;

D is the distance between the prism 5 of the telemeter (1, 7) (i.e. half the total path followed by the electromagnetic radiation); and c is the speed of light.

In order to determine the distance separating the two observation points with high accuracy (i.e. about 1 mm), it is theoretically necessary to have very fine measuring resolution (about $3.3 \times 10^{-12}$ sec).

For this reason, when the modulating signal is at a high frequency, it has become conventional to measure the phase shift between two low frequency signals.

To begin with, the received modulation signal generated at the output from the amplifier stage 8 is transposed to a low frequency signal $(F_O - F_T)$ (e.g. about 1,500 Hz) by mixing the received modulation signal in a mixer 9 with the signal from a local oscillator 10. It should be recalled that the low frequency signal obtained at the output from the mixer conveys the same phase information as the received high frequency modulation signal.

Secondly, the high frequency $F_T$ and the high frequency $F_O$ from the local oscillators 3 and 10 are applied to a second mixer 11 to produce a reference low frequency signal.

This low frequency reference signal is applied together with the high frequency $F_O$ signal from the oscillator 10 to a digital phasemeter 16, while the low frequency transposed received modulation signal from the mixer 9 is also applied to the phasemeter 16, via a low frequency amplifier 12 an automatic gain control stage 13. a bandpass filter 14 for the frequency band $\Delta\nu_1$, and a pulse shaping stage 15 which transforms the analog signal from the filter output into a logical square wave signal. These various components are designed so that phase measurement is independent of the signal amplitude of the received modulation.

The digital phasemeter 16 determines the amplitude of the phase shift $\phi$ between the emitted signal and the received signal. Phase samples $\phi_i$ generated by the phasemeter 16 are processed by a processor unit 17 which determines the arithmetic mean $\hat{\phi}_A$ of the samples:

$$\hat{\phi}_A = \frac{1}{n} \sum_{i=1}^{n} \phi_i \quad (2)$$

The symbol " ∧ " is used in the present application to designated estimated values.

The processor unit 17 then determines the amplitude of the distance separating the two observation points on the basis of equation (1).

The signal produced by the processor unit 17 is digitized to display the distance on a display 18.

It should be observed that to resolve the ambiguity due to each passage of the phase angle $\phi$ through $2\pi$, i.e. multiples of the distance $c/2F_T$, measurements are conventionally performed at one or more frequencies whidh are lower than the frequency $F_T$. These arrangements are well known to the person skilled in the art and are not described further.

It should also be observed that the filter 14 conventionally has a bandwidth $\Delta\nu_1$ which is relatively narrow (about 100 Hz) in order to reduce detection noise levels before being applied to the input of the phasemeter 16. The phase samples $\phi_i$ are thus correlated and it is not necessary to sample at a period of less than kT, where T is the low frequency period obtained at the outputs of the mixers, and k is a numter such that kT is less than $1/\Delta\nu_1$.

In fact, taking the arithmetic mean $\hat{\phi}_A$ constitutes a stage of digital filtering in addition to the analog filtering.

It should also be observed that with a large number of elementary measurements $\phi_i$ which are highly correlated, the variance of the result $V(\phi_A)$ tends towards a limit which does not depend on the number of samples, but rather depends only on the measurement time $t_m$:

$$V(\phi_A) = \frac{k_0 V(\phi_i)}{t_m} \quad (3)$$

(where kO is a constant).

The Applicant seeks to provide an improved telemetry method which enables the accuracy of the measurement to be improved and also enables the range to be increased.

The Applicant has observed that the medium through which the signal propagates between the two observation points is generally formed by masses of air in movement which are not homogeneous in temperature. This results in a field of refractive index gradients $\overline{n}_i$ in which the amplitudes and directions of the field are random in time.

Although the resulting optical path is in fact a sinuous path, calculation and experiment have shown that the increase in path length between the two observation points is negligible, and thus that turbulance does not directly affect the phase measurement.

In contrast, turbulance does occasionally cause the signal to disappear thereby erratically reducing the signal to noise ratio and thus reducing the accuracy of the measurement since:

$$V(\phi_i) = \frac{k_1 N_A^2}{S^2} \quad (4)$$

in which:

$V(\phi_i)$ represents the variance in the phase samples $\phi_i$;

S represents the received signal of amplitude which is random in time;

$N_A$ represents the r.m.s. noise value; and $k_1$ is a constant.

The spectrum of the amplitude modulation applied to the signal by the turbulance, herein after referred to as the turbulance spectrum has a bandwidth $\Delta F$.

Further, experiments have shown that the amplitude of the signal expressed in dB is a random variable obeying the normal distribution law, i.e. it can be defined by an average $\mu_s$ and a standard deviation $\sigma_s$.

Attempts could be made to improve the performance of a telemeter in the presence of turbulence, e.g. by using lenses of large diameter in order to simultaneously increase the average $\mu_s$ of the signal and to reduce the standard deviation $\sigma_s$ thereof.

However, such a solution also increases the volume, the weight and the price of the apparatus. Furthermore, such a solution does not necessarily improve the accuracy of the final measurement.

Preferred implementations of the present invention provide a new method of determining the distance between two points by reducing the sensitivity of a telemeter to turbulence without changing the outward appearance of the telemeter instrument.

SUMMARY OF THE INVENTION

The present invention provides a method comprising the steps of emitting oscillator modulated electromagnetic radiation from a first point towards a second point, in reflecting the said electromagnetic radiation from the second point back towards the first point, in receiving the reflected electromagnetic radiation at the first point by means of a receiver, in comparing the phase of a first signal derived from the receiver and of a second signal derived from the emission modulation, and in generating phase samples $\phi_i$ representative of the phase difference between the first and second signals, the improvement wherein the method further includes the following steps:

(i) in generating a signal representative of the instantaneous variance $V(\phi_i)$ of the phase samples $\phi_i$;

(ii) in generating as an estimation of the phase an intermediate signal derived from the average $\hat{\phi}_E$ of n phase samples $\phi_i$ weighted by their instantaneous variance;

(iii) in generating a useful signal representative of the value of the distance (D) on the basis of the phase estimation $\hat{\phi}_E$; and (iv) in displaying this distance value.

Advantageously the components of the signal detection chain are designed in such a manner that the range of signal amplitude variation passed without distortion by the analog signals covers the width of the distribution function of the received signal amplitudes, i.e. a range of four to six times the standard deviation $\sigma_s$ of the signal.

The equivalent passband $\Delta \nu_2$ of the filters of the signal detection circuits is greater than the turbulance spectrum width $\Delta F$.

Preferably, the above-mentioned step (ii) is performed by taking as the value representative of the instantaneous variance of the phase samples, a signal which is proportional to the inverse of the square of the value of the noisy signal under consideration over a passband which is slightly larger than or equal to the turbulance spectrum width.

The advantages provided by the invention are explained below.

In a variant, the above mentioned step (i) is performed by means of a detection chain which takes a set of $n_e$ samples at a rate $n_e$ times greater than the rate at which the n phase samples $\phi_i$ are taken. The method in accordance with the invention advantageously further includes a preliminary step consisting in controlling an optical attenuator inserted on the propagation path of the electromagnetic radiation in such a manner than the average $\mu_s$ of the received signal S is less than the upper limit of the signal which can be received without distortion (h) by a factor of $k_4$ times the standard deviation $\sigma_s$, where $k_4$ lies between 1 and 2.

Advantageously the method includes the steps of:

(a) measuring the r.m.s. noise value $N_A$;

(b) generating a signal representative of the average $\mu_s$ and the standard deviation $\sigma_s$ of the signal on the basis of a collection of samples $y_i$ of the signal (in decibels) together with the value of the attenuation $A_j$ (in decibels) applied to the radiation; and (c) generating a signal representative of an estimate of the phase variance $\widehat{V(\phi_E)}$ given the r.m.s. noise value, the average $\mu_s$ and the standard deviation $\sigma_s$.

Advantageously, the method includes the step of generating a signal representative of an evaluation of the standard deviation of the distance $\hat{\sigma}_D$ proportional to the square root of the phase variance estimation $\widehat{V(\phi_E)}$.

Preferably the method in accordance with the invention includes a further step consisting in increasing the gain M of the receiver in increments until one of the three following conditions is satisfied:

(1) receiver bias is optimized;

(2) the gain M has reached its maximum permitted value; and (3) the average $\mu_s$ of the signal has reached an optimum value corresponding to the upper limit of the signal which can be admitted without distortion (h) as reduced by $k_4$ times the standard deviation $\sigma_s$, where $k_4$ lies in the range 1 to 2.

In one particular case, the receiver is an avalanche photodiode and the above-mentioned condition (1) is obtained when the noise $N_A$ under ambient lighting which is referred to hereafter as the "ambient noise", is about twice the noise $N_O$ from the amplifiers.

Preferably, the generation of the signals representative respectively of the estimation of the phase variance $\widehat{V(\phi_E)}$ and of the standard deviation of the distance $\hat{\sigma}_D$ deduced therefrom, together with the display of the standard deviation of the distance is reiterated after adjusting the gain M of the receiver.

Advantageously, steps, (i) to (iii) are continued until the standard deviation $\sigma_D$ of the distance is less than a predetermined maximum value $(\sigma_D)_M$ thus increasing the number n of samples taken and improving the accuracy of the measurement.

The present invention also provides a telemeter comprising:

transmitter means associated with an oscillator suitable for emitting modulated electromagnetic radiation towards an observation point;

receiver means suitable for detecting the electromagnetic radiation after reflection at the said observation point;

comparator means suitable for comparing the phase of a first signal derived from the receiver and of a second signal derived from the emitted modulation, in order to generate phase samples $\phi_i$ representative of the phase difference between the first and second signals;

the improvement wherein the telemeter further includes:

means suitable for generating a signal representative of the value of the instantaneous variance $V(\phi_i)$ of the phase samples $\phi_i$;

processor means suitable for generating an intermediate signal derived from the average $\hat{\phi}_E$ of n phase samples $\phi_i$ weighted by the said value representative of their instantaneous variance;

means suitable for generating a useful signal representative of the distance travelled by the electromagnetic radiation between the transmitter means and the receiver means on the base of the said intermediate signal derived from the weighted average $\hat{\phi}_E$; and display means responsive to the useful signal and adapted to display data representative of the distance travelled by the radiation.

Preferably, the means suitable for generating a signal representative of the value of the instantaneous variance comprises means sensitive to the value of the noisy signal under consideration in a passband which is slightly wider than or equal to the turbulence spectrum width.

Advantageously, the processor means are adapted to generate a signal representative of the estimated average of the phase $\hat{\phi}_E$ on the basis of the equation:

$$\hat{\phi}_E = \frac{\sum_{i=1}^{n} \phi_i Y_{i\Delta\nu2}^2}{\sum_{i=1}^{n} Y_{i\Delta\nu2}^2} \quad (5)$$

where $\phi_i$ represents phase samples and $Y_{i\Delta\nu2}$ represents the value of the noisy signal from a recursive filter having bandwidth $\Delta\nu_2$.

In a variant, the telemeter may comprise a first detection chain for taking the phase samples $\phi_i$ and a second detection chain suitable for taking a set of ne samples at a sampling rate which is ne times greater than the rate at which the n phase samples $\phi_i$ are taken, for the purpose of determining their instantaneous variance $V(\phi_i)$.

Advantageously the telemeter further comprises:

an optical attenuator comprising a plurality of filters inserted on the propagation path of the electromagnetic radiation; and control means responsive to the average $\mu_s$ of the received signal S and suitable for controlling the positioning of the attenuator in such a manner than the said average is kept below the upper limit of the signal which can admitted without distortion by a factor of $k_4$ times the standard deviation $\sigma_s$, where $k_4$ lies in the range 1 to 2.

Advantageously the telemeter further comprises:

means for generating a signal representative of the r.m.s. value of the ambient noise $N_A$;

means for generating signals representative of the average $\mu_s$ and of the standard deviation $\sigma_s$ of the signal expressed dB;

means suitable for generating a signal representative of the estimated variance of the phase on the basis of the equation:

$$\widehat{V(\phi_E)} = \frac{k_2 N_A^2}{t_m} \cdot \frac{e^{-2a(\mu_s + a\sigma_s^2)}}{F\left[\dfrac{h - \mu_s - 2a\sigma_s^2}{\sigma_s}\right]} \quad (6)$$

in which $k_2$ and a are constants, tm represents the measurement time, the notation F[ ] represents the normal law distribution function of the centered and reduced variable, and h designates the upper limit of the signal which can be admitted without distortion; and means sensitive to the said signal and suitable for displaying the estimated phase variance.

Advantageously the telemeter further comprises an optical attenuator comprising a plurality of filters inserted on the propagation path of the electromagnetic radiation, and the means suitable for generating signals representative of the average $\mu_s$ and the standard deviation $\sigma_s$ of the signal expressed in dB are adapted to generate signals which correspond respectively to:

$$\mu_s = \frac{1}{p} \sum_{i=1}^{p} (A_j + y_i) \quad (7)$$

and $$\sigma_s = \frac{1}{P} \sqrt{\sum_{i=1}^{p} (A_j + y_i)^2 - \mu_s^2} \quad (8)$$

in which equation $y_i$ represents the signal samples expressed in dB and $A_j$ represents the attenuation of the signal due to the attenuator as associated with respective samples $y_i$, while p represents the total number of samples taken into consideration. It should be observed that $Y_i$ is used herein to represent signal samples which are linear.

Preferably, a telemeter in accordance with the invention further comprises:

means suitable for generating a signal representative of an evaluation of the standard deviation of the distance $\sigma_D$ proportional to the square route of the estimation of the phase variance $\widehat{V(\phi_E)}$, or $V(\hat{\phi}_E)$; and means suitable for displaying the standard deviation of the distance $\hat{\sigma}_D$.

Advantageously the telemeter in accordance with the invention includes means suitable for controlling incremental increases in the gain M of the receiver until one of the three following conditions is satisfied:

(1) the receiver bias is optimized;
(2) the gain M has reached its maximum permitted value; and
(3) the average of the signal $\mu_s$ has reached an optimum value corresponding to the upper limit of the signal admitted without distortion (h) as reduced by a factor of $k_4$ times the standard deviation $\sigma_s$, where $k_4$ lies in the range 1 to 2.

In a particular case, the receiver is an avalanche photodiode and the above-mentioned condition, (1) is obtained when the ambient noise $N_A$ is about twice the amplifier noise $N_O$.

Advantageously, the telemeter includes means suitable for comparing the standard deviation $\sigma_D$ with a predetermined maximum value to control the accumulation of samples and to improve the accuracy of the measurement for as long as the standard deviation is greater than the said predetermined value.

BRIEF DESCRIPTION OF THE DRAWINGS

An implementation and an embodiment of the invention are described by way of example with reference to the accompanying drawing, in which:

FIGS. 3A, 3B and 3C should be taken together as a single flowchart showing the steps in the performance of the method in accordance with the invention.

MORE DETAILED DESCRIPTION

Figure 1:
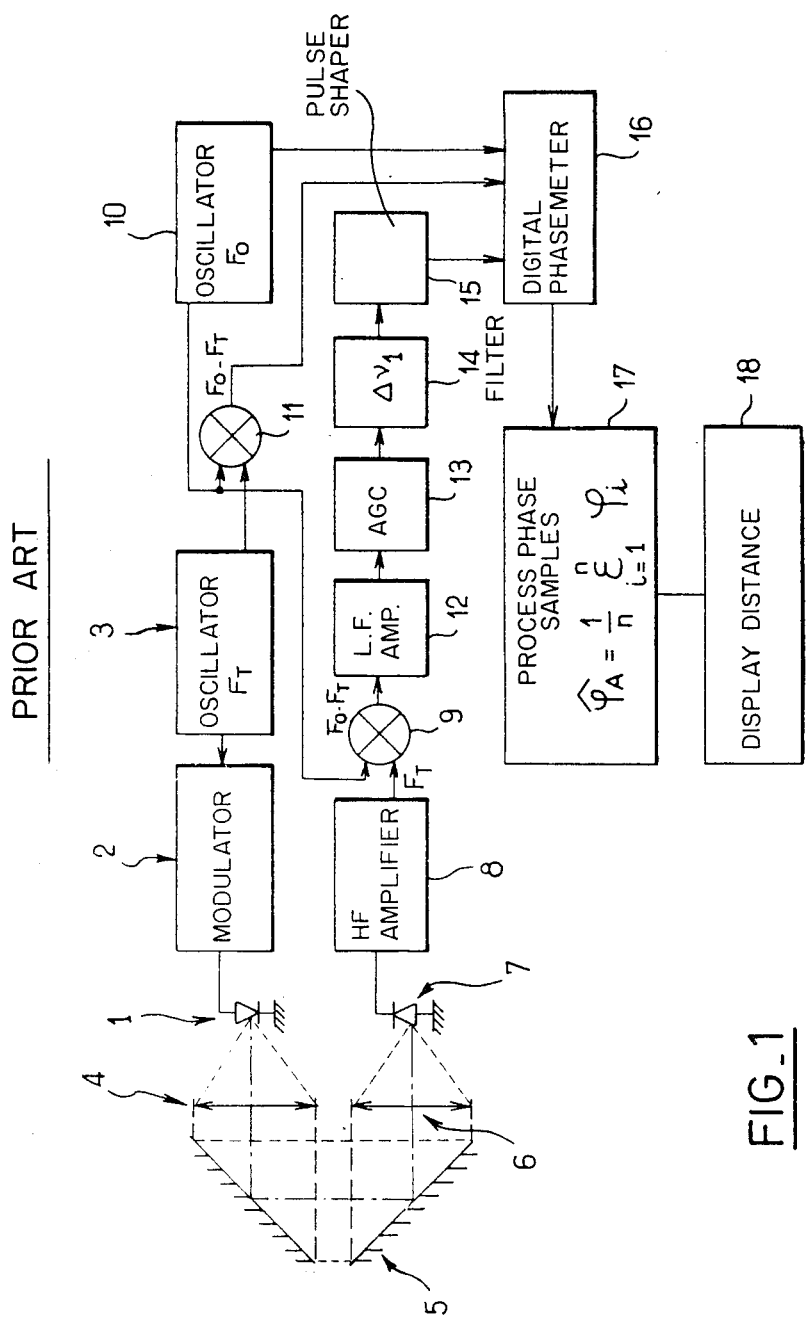
FIG. 1 is a block diagram of the prior art and has already been described.

We begin by describing the method of determining the distance D between the two observation points under consideration by means of the present invention.

As mentioned above, the distance D is determined on the basis of the phase shift $\phi$ by means of a relationship based on equation (1).

However, unlike conventional telemeters in which the best estimation of the phase was taken as being constituted by the arithmetic mean $\hat{\phi}_A$ of n phase samples $\phi_i$, $$\left( \text{where } \hat{\phi}_A = \frac{1}{n} \sum_{i=1}^{n} \phi_i \right),$$

the present invention now proposes to evaluate the distance D on the basis of a phase estimate determined as the average $\hat{\phi}_E$ of n samples $\phi_1$ weighted by their instantaneous variance $V(\phi_i)$ such that:

$$\hat{\phi}_E = \frac{\sum_{i=1}^{n} \phi_i / V(\phi_i)}{\sum_{i=1}^{n} 1/V(\phi_i)} \tag{9}$$

The improvement provided by such processing in accordance with the invention may be evaluated by calculating the ratio of the variances $V(\hat{\phi}_A)$ and $V(\hat{\phi}_E)$ of the arithmetic mean $\hat{\phi}_A$ and of the weighted mean $\hat{\phi}_E$.

The variance of $\hat{\phi}_A$ and of $\hat{\phi}_E$ is not constant from one group of measurements to another. However, if the time during which samples are taken $t_m$ is long enough it can be shown that $V(\hat{\phi}_A)$ and $V(\hat{\phi}_E)$ tend respectively to:

$$\widehat{V(\phi_A)} = \frac{k_2 N_A^2}{t_m} e^{-2a(\mu_s - a\sigma_s^2)} \times F\left[ \frac{-b + \mu_s - 2a\sigma_s^2}{\sigma_s} \right] \tag{10}$$

$$\widehat{V(\phi_E)} = \frac{k_2 N_A^2}{t_m} \frac{e^{-2a(\mu_s + a\sigma_s^2)}}{F\left[ \frac{h - \mu_s - 2a\sigma_s^2}{\sigma_s} \right]} \tag{6}$$

in which equations:

$$a = \frac{\text{Log } 10}{20} = 0.115$$

$k_2$ is a constant, b represents the minimum threshold for the admitted signal expressed in dB;

h represents the upper limit of the signal expressed in dB that can be admitted without distortion, $N_A$ represents the r.m.s. value of the ambient noise $N_A$, $\mu_s$ represents the average signal amplitude;

$\sigma_s$ represents the standard deviation of the signal; and the notation F [ ] represents the normal law distribution function of the reduced centered variable.

More precisely, the above-mentioned evaluation of the improvement provided by the invention may be determined by calculating efficiency $\eta$ for different values of standard deviation $\sigma_s$ $$\eta = \sqrt{V(\phi_A)/V(\phi_E)} \tag{11}$$

as a function of the average $\mu_s$.

Thus, on the basis of (6) and (10) we obtain:

$$\eta = e^{0.026\sigma_s^2} \sqrt{F\left[ \frac{-b + \mu_s - 0.23\sigma_s^2}{\sigma_s} \right] \times F\left[ \frac{h - \mu_s - 0.23\sigma_s^2}{\sigma_s} \right]} \tag{12}$$

The main difficulty in implementing the above-mentioned method and more particularly for determining $\hat{\phi}_E$ on the basis of equation (9) lies in acquiring the instantaneous variance $V(\phi_i)$ to perform the weighting.

In theory, the estimate of $V(\phi_i)$ should be obtained from a set of $n_e$ samples taken at a sampling rate $n_e$ times the sampling rate used for $\phi_i$, (i.e. $(n_e/kT)$.

To do this, with phase samples $\phi_i$ being taken at a rate of $(1/kT)$, a second low frequency detection chain may be provided operating at the frequency $(n_e/kT)$, and having a passband of $(n_e\Delta\nu_2/k)$ so that the correlation between the measurements does not increase the uncertainty in the estimate $\widehat{V(\phi_i)}$.

The term second detection chain is used to designate either an assembly comprising a mixer, an amplifier, an AGC stage, a filter, a pulse shaping circuit, and a phase meter connected to the output of the amplifier 8, or else simply a phase meter providing phase samples which are separated by a phase increment of ($2\pi ne/k$).

However, the Applicant proposes a method avoiding the requirement to provide two detection chains.

To do this, the Applicant has observed, firstly that the r.m.s. noise value $N_A$ may be taken to be constant over the few seconds that a measurement requires.

Thus:

$$N_A{}^2 = N_O{}^2 + 2q\eta_q P_s M^\alpha \Delta\nu_2, \quad (13),$$

in which $N_O$ represents the amplifier noise;
$q = 1.6 \times 10^{-19}$ c
M represents the multiplication factor with a photodiode 7;
$\alpha$ represents the ionization coefficient which is generally about 2.3;
$\eta_q$ represents the quantum efficiency and is generally about 0.3;
$P_s$ represents the optical power received by the photodiode; and
$\Delta\nu_2$ represents the equivalent passband of the detection circuit filters.

The coefficient M is kept constant by the control circuits during any one measurement, the factor $P_s$ is thus the only factor likely to vary $N_A$.

However, the field detected by the receiver optics extends only over a few minutes (i.e. a few meters at 1 km). Thus, the probability of the illumination of the "observed" zone changing, i.e. the probability of ambient sunlight changing, during the short time required for a measurement is very low.

Further, although the signal S does not exist on its own, the filtering performed by the detector circuits reduce the noise to a negligible level relative to the signal, so it is possible to write:

$$Y_{i\Delta\nu_2} \cong S \quad (14)$$

in which $Y_{i\Delta\nu_2}$ represents the value of noisy signal coming from a recursive filter having a pass bandwidth of $\Delta\nu_2$.

Consequently, the Applicant has determined that during a measurement equation (4) reduces to $$V(\phi_i) = k_1 N_A{}^2 / Y_i{}^2{}_{\Delta\nu_2} \quad (15)$$

By combining equations (9) and (15) we obtain:

$$\hat{\phi}_E = \frac{\sum_{i=1}^{n} \phi_i Y_{i\Delta\nu_2}^2}{\sum_{i=1}^{n} Y_{i\Delta\nu_2}^2} \quad (5)$$

The phase estimation $\hat{\phi}_E$ as determined on the basis of equation (5) and thus the determination of the distance D is therefore simplified and made possible using a conventional telemeter.

A telemeter in accordance with the invention is now described in greater detail with reference to FIGS. 2, 3A, 3B and 3C.

Figure 2:
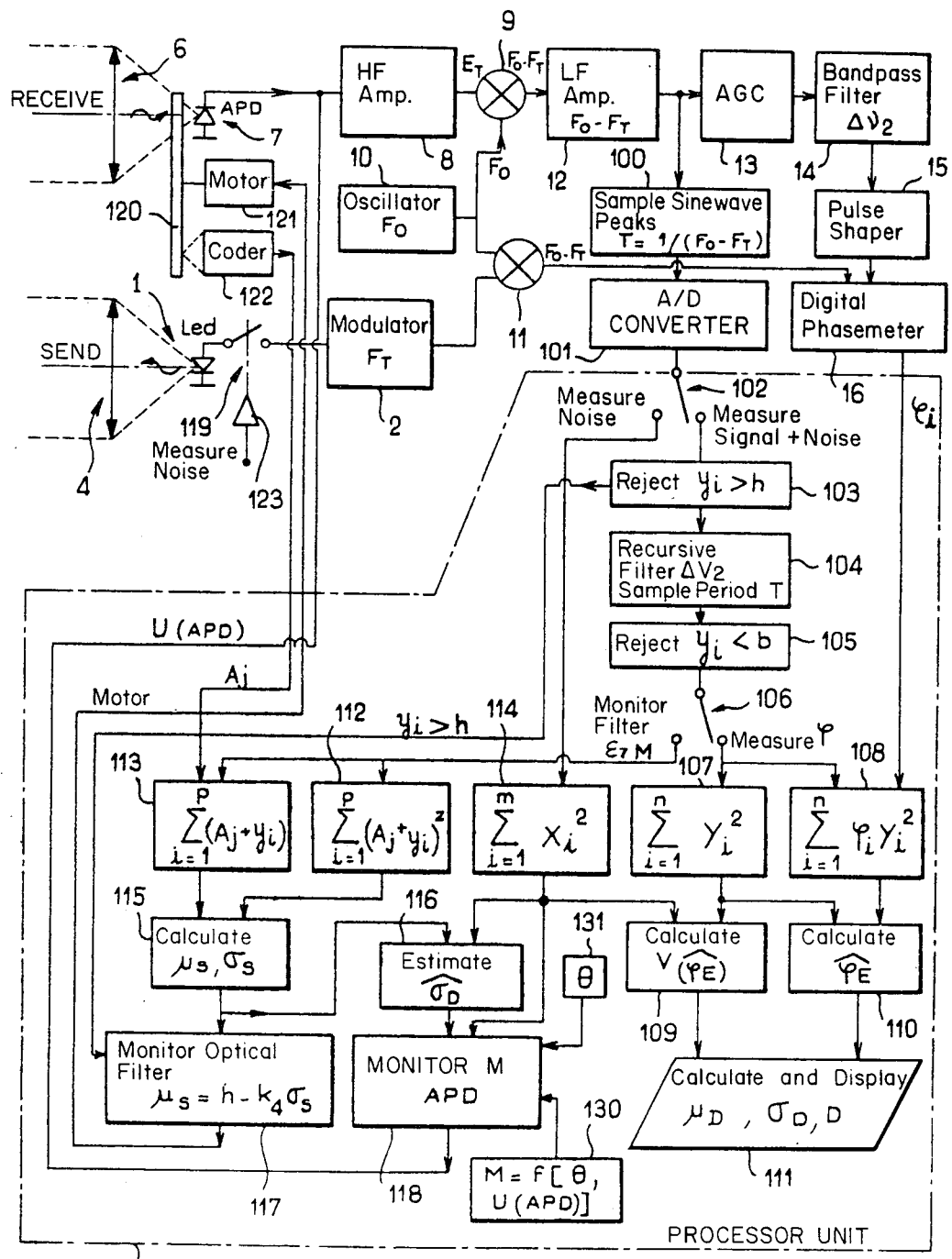
FIG. 2 is a block diagram of a telemeter in accordance with the invention.

As shown in FIG. 2, the processor unit UC in accordance with the invention is sensitive firstly to the output signal from the phasemeter 16 representative of the phase shift $\phi_i$, and secondly to a signal taken from the output of the amplifier 12 and representative either of the noisy signal or else of the noise alone, depending on the on or off state of the emission LED 1.

It may be observed that this LED is connected to the modulator 2 via a switch 119 under the control of a gate 123.

When the signal applied to the gate 123 closes the switch 119, the LED 1 is powered and the measuring chain is sensitive to the noisy signal.

Conversely, when the signal applied to the gate 123 opens the switch 119, the measurement chain is sensitive to noise only since the LED is unpowered.

The second signal representative of the noisy signal or of the noise on its own to which the central processor unit UC is sensitive is applied thereto via a series assembly comprising firstly a sampling stage 100 connected to the output of the amplifier 12 for detecting the peaks of the sinusoidal signal appearing at the output thereof, and secondly an analog-to-digital converter 101.

Further, for a telemeter utilization range running from a few meters to several kilometers, the dynamic range of optical power received is greater than $10^6$ (i.e. 120 dB) of signal strength.

For this reason, as shown diagrammatically in FIG. 2, the telemeter includes a variable optical attenuator inserted on the path of the electromagnetic radiation and suitable for varying the optical power of the signal in steps to avoid the electronic circuits from being saturated by a signal of amplitude greater than h.

More precisely, the optical attenuator comprises a set of gray filters 120 which are rotatable in front of the receiver diode 7 under the control of a motor 121. The position of the filters 120 is monitored by a coder 122.

Figure 3C:
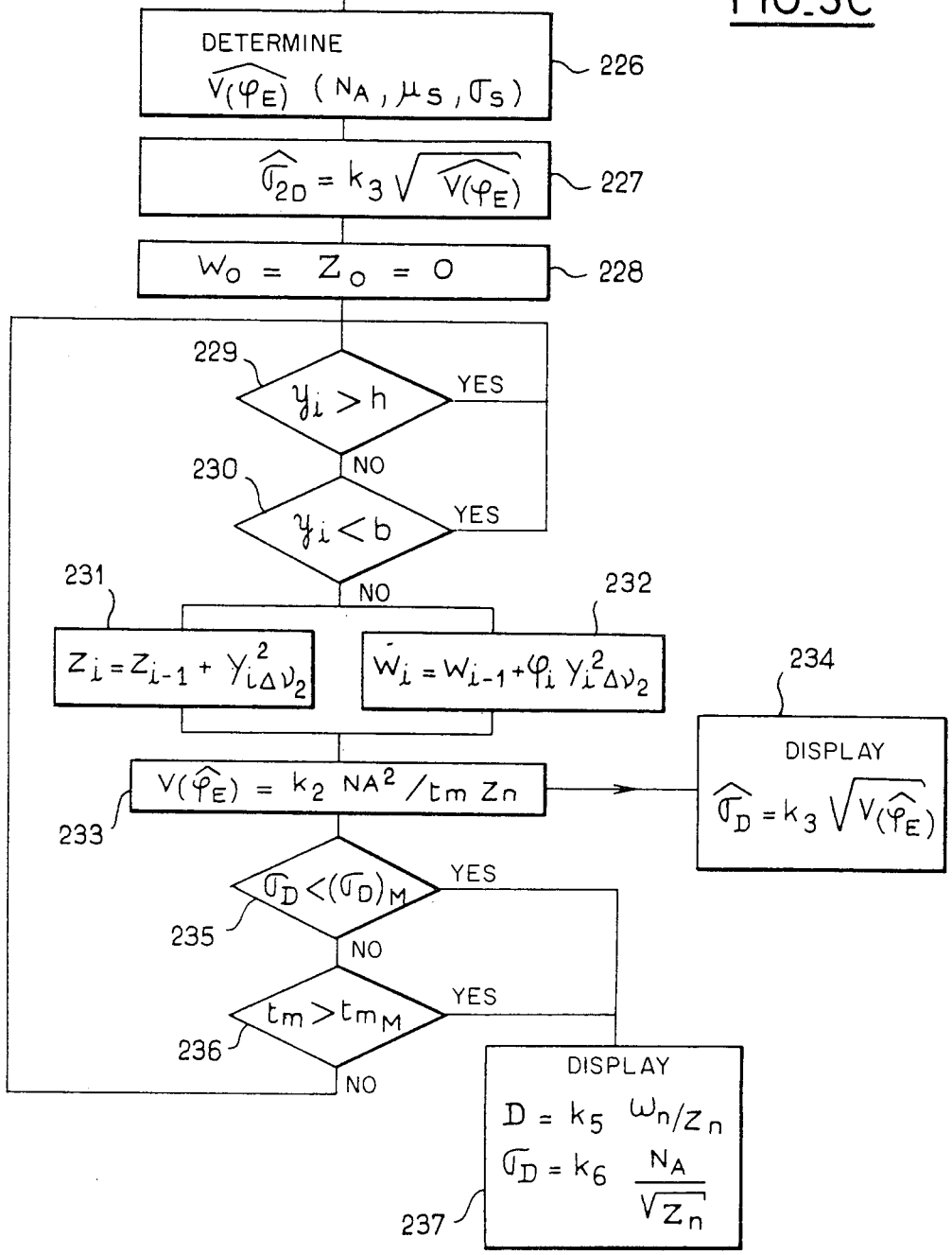

The structure of the central unit UC shown diagrammatically in FIG. 2 is described with reference to the flowchart of FIGS. 3A to 3C. As shown in FIG. 3A, the process of measuring the distance D is initialized by an operator acting on the telemeter keyboard (step 200 KEY IN DISTANCE MEASURING COMMAND).

After this instruction, the central processor unit UC of the telemeter receives initially by measuring the noise in ambient light. As explained below, this noise measurement is used for evaluating the standard deviation $\sigma_D$ of the distance D.

In FIG. 2. the noise measuring process is diagrammatically illustrated by the link between the converter 101 and a block 114 via a switch 102. The block 114 performs the function $$\sum_{i=1}^{m} X_i^2$$

To perform this measurement, at step 201 (LED = 0 & $A_j = 0$) the central control unit firstly opens the switch 119 and thus turns off the LED 1, and secondly positions the gray filters 120 to obtain minimum signal attenuation.

At the following step 202, the central unit determines the r.m.s. value $N_A$ of the ambient noise on the basis of the equation $$N_A{}^2 = \frac{1}{m} \sum_{i=1}^{m} X_i^2 \quad (16)$$

in which $X_i$ represents the samples of ambient noise.

In order to acquire the non-correlated noise samples $X_i$ rapidly, they are taken in the band $\Delta f$ at each period T.

The value of m (the number of samples) is determined according to a compromise between the desired accuracy for the variance $V(\hat{\phi}_E)$ and an acceptable acquisition time for the samples $X_i$.

The squares of the samples, $X_i^2$, are summed by means reference diagrammatically as 114 in FIG. 2.

The average $\mu_s$ and the standard deviation $\sigma_s$ of the amplitudes of the signal $y_i$ are then evaluated in dB.

In FIG. 2 this process is illustrated diagrammatically by establishing a link between the converter 101 and the block 103 via the switch 102. The block 103 serves to reject samples $y_i > h$.

To measure $\mu_s$ and $\sigma_s$ correctly, the value h must not be exceeded since that would create amplitude distortions.

When the time taken to perform the entire measuring program is not critical, it may begin by accumulating voltage samples after a period of a few seconds during which any overshoot by the signal causes the optical attenuation $\Delta A$ to be incremented by actuating the filter 120.

The following values are then obtained:

$$\mu_s = \frac{1}{p} \sum_{i=1}^{p} y_i \quad (17)$$

and $$\sigma_s = \sqrt{\frac{1}{p} \sum_{i=1}^{p} y_i^2 - \mu_s^2} \quad (18)$$

However, when the time taken for complete program operation is to be minimized, the control of the filter 121 may be speeded up by a monitoring device 117 which receives information representative of the signal overshooting h and representative of the position of the filter. For example, if the filter 120 is a rotary disk having a progressive gray scale, an incremental coder may supply a number correspsonding to the attentuation $A_j$.

Each time the threshold h is exceeded, the disk turns through j increments corresponding to an attenuation $\Delta A$. During time intervals for which $y_i$ is less than h two sums are performed:

$$W_p = \sum_{i=1}^{p} (A_j + y_i) \quad (19)$$

and $$Z_p = \sum_{i=1}^{p} (A_j + y_i)^2 \quad (20)$$

Further, the attentuation marked $\Delta A$ must be chosen in such a manner that the maximum number of high amplitude measurements suppressed by comparison with the threshold h is small compared with p.

When this condition is satisfied, equations 17 and 18 become $$\mu_s = \frac{1}{p} \sum_{i=1}^{p} (A_j + y_i) \quad (7)$$

and $$\sigma_s = \sqrt{\frac{1}{p} \sum_{i=1}^{p} (A_j + y_i)^2 - \mu_s^2} \quad (8)$$

In order to do this as shown in FIG. 3A at step 203 (LED=1 & $A_j$=0) the LED 1 is excited by closing the switch 119, with the signal attenuation caused by the filters 120 still being at a minimum value.

At the following step 204 ($y_i > h$) (performed by the means referenced diagrammatically as 103 in FIG. 2) a test is performed to see whether the value $y_i$ of the noisy signal is greater than or less than a value h corresponding to the upper limit of signal which can be admitted without distortion.

If the upper limit h is exceeded, step 204 is followed by a step 205 ($A_j = A_{j-i} + \Delta A$) during which the motor 121 is powered from the monitoring block 117 to move the gray filters 120 to increase the optical attenuation of the signals by one step.

After each increment in attenuation, the test of step 204 is repeated. Signals $y_i$ of amplitude less than the limit h are thus accumulated in association with attenuation values $A_j$, and after passing through a recursive filter $\Delta v_2$ (104) the noisy signals $y_i$ are compared with a predetermined threshold b at step 206.

If the value of the noisy signal is less than the threshold b, an alarm is triggered at step 207 to warn the operator that the signal level being received is too low for proper measurement.

In contrast, if the value of the noisy signal is greater than the threshold b, step 206 is followed by steps 208 and 209.

In step 208 the means 113 of the central unit determine a signal representative of the value $$W_p = \sum_{i=1}^{p} (A_j + y_i) \quad (19)$$

while in step 209 the means 112 of the central unit determine a signal representative of the value $$Z_p = \sum_{i=1}^{p} (A_j + y_i)^2 \quad (20)$$

in which relationships $A_j$ represents the amplitude of the attenuation inserted by the filters 120.

In FIG. 2 this process is illustrated diagrammatically by establishing a link between block 105 and blocks 112 and 113 via switch 106.

Steps 209 and 209 are then followed by a step 210 during which the means referenced 115 in FIG. 2 which are connected to blocks 112 and 113 determine firstly the average $\mu_s$ and secondly the standard deviation $\sigma_s$ on the basis of equations $$\mu_s = W_p/p, \quad (21)$$

and $$\sigma_s^2 = Z_p/p - \mu_s^2 \quad (22)$$

which are derived respectively from equations (7) and (8) and in which p represents the number of samples taken into account during steps 208 and 209.

At the following step 211 the central unit UC proceeds to estimate the variance of the phase $\phi_E$ on the basis of equation $$\widehat{V(\phi_E)} = \frac{k_2 N_A^2}{t_m} \cdot \frac{e^{-2a(\mu_s + a\sigma_s 2)}}{F\left[\dfrac{h - \mu_s - 2a\sigma_s^2}{\sigma_s}\right]} \tag{6}$$

The means referenced 116 in FIG. 2 then proceed at step 212 to perform a preliminary estimate and to display standard deviation of the distance $\widehat{\sigma_{1D}}$ by generating a signal representative of:

$$\widehat{\sigma_{1D}} = k_3 \sqrt{\widehat{V(\phi_E)}} \tag{23}$$

As a function of the value displayed, the operator decides whether or not to continue with the measurement.

If necessary, the operator may modify the measurement period $t_m$ or the parameters of the optical link (e.g. the number of prisms).

Assuming that measurement does continue, step 212 is followed by a test step 213 (FIG. 3B) during which the estimated value $\hat{\sigma}_{1D}$ of the standard deviation is compared with a predetermined maximum value $(\sigma_D)_M$ for the standard deviation.

If the estimated value $\hat{\sigma}_{1D}$ is less than the maximum value $(\sigma_D)_M$ step 213 is followed by step 214 during which the means 117 of the telemeter adjust the position of the gray filters 120 so that the average $\mu_s$ obeys the equation $$\mu_s = h - k_4 \sigma_s \tag{24}$$

in which $\underline{h}$ represents the upper limit of the signal which can be admitted without distortion and $k_4$ is a factor in the range 1 to 2 which depends on the average duration of the periods for which the threshold $\underline{h}$ was exceeded and on the settling time allowed for the circuits to come back to their range of linear operation.

Step 214 is followed by step 226.

In contrast, if the estimated value of the standard deviation $\hat{\sigma}_{1D}$ is greater than the maximum value $(\sigma_D)_M$, step 213 leads to an adjustment of the gain M of the avalanche photodiode 7 under the control of the means 118 of the central unit UC.

The decision to lengthen the measurement program to increase M, which is set to a minimum value $M_O$ when the system is initialized is thus determined as a function of the value of the standard deviation.

To adjust M to its optimum value when $\hat{\sigma}_{1D} > (\sigma_D)_M$, a measurement is initially made of the dark noise.

The central unit UC controls the switch 102 (FIG. 2) to connect the converter 101 to the means 114.

Furthermore, at step 215 (LED=0 & $A_j = A_M$) the LED 1 is turned off by opening the switch 119 and the filters 120 are activated by controlling the motor 121 to cause maximum attenuation $A_M$ of the signal.

Then at step 216 the value of the noise due to the amplifiers is determined by means of the equation:

$$N_0^2 = \frac{1}{m} \sum_{i=1}^{m} X_i^2 \tag{25}$$

Then at step 217 the motor 121 is again activated so that the filters 120 cause minimum attenuation of the optical signal, while the LED 1 is left switched off, thereby measuring the ambient noise $N_A$.

Step 217 is followed by step 219 during which the central unit tests whether the ratio $N_A/N_O$ is greater than 2.

If it is greater than 2, the bias of the avalanche photodiode is optimized and it is not necessary to increase M so step 219 is followed by the above-mentioned step 226.

If the ratio is not greater than 2, the photodiode bias is not optimized so step 219 is followed by step 220 ($M_j = M_{j-1} + \Delta M$) during which the gain M is increased by increments $\Delta M$, where M and $\Delta M$ are expressed in dB.

At the following step 221 the r.m.s. value of the ambient noise $N_A$ is determined in a similar manner to the above-mentioned step 202 by means of the equation:

$$N_A^2 = \frac{1}{m} \sum_{i=1}^{m} X_i^2 \tag{16}$$

Finally, at step 223 the central unit determines the value of the average $\mu_s$ using the equation (26)

$$\mu_{sj} = M_j - M_O + \mu_{sj-1} \tag{26}$$

At step 224 the central unit tests whether the factor $M_j$ has reached the maximum permitted value $M_M$.

If so step 224 is followed by step 226.

Otherwise M is less than $M_M$ and the central unit performs 225 to test whether the signal average $\mu_{sj}$ has reached the optimum value (32) $\mu_{sj} = h - k_4 \sigma_s$.

If this equality is true, step 225 is followed by step 226.

The gain M is now adjusted.

In the opposite case, step 225 is followed by the test of step 219.

The central unit UC then proceeds to perform a new estimate of the standard deviation of the distance $\hat{\sigma}_{2D}$.

At step 226 the central unit determines the estimated value of the variance of the phase shift measurement $\widehat{V(\phi_E)}$ on the basis of equation (6).

The means 116 of the central unit UC then proceed with step 227 to make a new estimate of the value of the standard deviation $\hat{\sigma}_{2D}$ on the basis of equation:

$$\hat{\sigma}_{2D} = k_3 \sqrt{\widehat{V(\phi_E)}} \tag{27}$$

and to display the result.

It then has to find the value of the weighted mean in accordance with the invention together with the standard deviation $\sigma_D$ of the distance.

To do this step 227 is followed by step 228 in which the two parameters W and Z are set to zero.

Block 103 (FIG. 2) is again connected to the converter 101 via the switch 102 and the means 107 and 108 are connected to the means 105 by the switch 106.

Then at step 229 the means 103 of the central unit UC verify that the value of the signal $y_i$ (in dB) is not greater than the upper limit of the signal $\underline{h}$ which can be admitted without distortion.

However, if the value of the signal $y_i$ is greater than the limit $\underline{h}$, the test 229 is repeated and the samples $y_i$ of the corresponding signal are not accumulated.

In contrast, if the value of the signal $y_i$ is not greater than the limit $\underline{h}$ the test 229 is followed by step 230 during which the means 105 of the central unit test whether the value of the signal $y_i$ is less than the threshold $\underline{b}$.

If it is not less, the test 230 is followed by a return to step 229.

If it is not less than the lower threshold $\underline{b}$, the samples $Y_i$ are accumumated and step 230 is followed by steps 231 and 232.

During these steps the means referenced 107 and 108 in FIG. 2 respectively determine the signals representative of the parameters:

$$Z_i = Z_{i-1} + Y_i^2{}_{\Delta v2} \tag{28}$$

and $$W_i = W_{i-1} + \phi_i Y_i^2{}_{\Delta v2} \tag{29}$$

Then the means 109 determine the estimated phase variance $V(\hat{\phi}_E)$ at step 233 by generating a signal representative of:

$$V(\hat{\phi}_E) = \frac{k_2 N_A^2}{t_m Z_n} = \frac{k_2 N_A^2}{t_m \sum_{i=1}^{n} Y_{i\Delta v2}^2} \tag{30}$$

The means 109 and 111 of the central unit then determine during step 234 an estimate of the value of the standard deviation $$\hat{\sigma}_D = k_3 \sqrt{V(\hat{\phi}_E)} . \tag{23}$$

In addition, following step 233, the central unit tests at step 235 whether the value of the standard deviation $\sigma_D$ less than a predetermined maximum value $(\sigma_D)_M$ for the standard deviation.

If it is less, then the value of the standard deviation is acceptable and step 235 is followed by step 237.

However, if the value of the standard deviation $\sigma_D$ is greater than the predetermined value $(\sigma_D)_M$, the test 235 is followed by step 236. During this step the central unit checks whether the measurement time $t_m$ has not exceeded a predetermined maximum time. If the measurement time $t_m$ is in fact less than the imposed maximum time $t_{mM}$, the test 236 is followed by the above-mentioned step 229 which is repeated.

However, if the predetermined measurement time has elapsed, the step 236 is followed nonetheless by the above-mentioned step 237.

During step 237 the means 111 determine and display firstly the value of the distance D, and secondly the value of the standard deviation on the distance on the basis of equations:

$$D = k_5 W_n / Z_n \tag{31}$$

(based on equation (5)) and $$\sigma_D = k_6 \frac{N_A}{\sqrt{Z_n}} \tag{32}$$

(based on equations (23) and (30)).

It may be observed that it is not essential to know the gain M with accuracy in order to optimize it, however as mentioned above the value of the gain M is used to evaluate the average at step 223 and to test the condition $M < M_M$ at step 224. For these reasons, it is desirable to know the value of M accurately.

Unfortunately, M is a non-linear function of the bias voltage of the photodiode and also of the ambient temperature. Thus the increments in M used at step 220 cannot be accurately calibrated.

A fair degree of accuracy on the value of M could be obtained by modulating the LED 1 so that it is periodically turned off, and then by measuring the signal obtained for each passage round the loop in which M is incremented.

However, it has turned out to be preferable to store a table of values in non-volatile or read only memory (130, FIG. 2) giving M as a function of the bias voltage U (APD) and as a function of temperature $\theta$.

A temperature sensor 131 placed close to the avalanche photodiode 7 thus delivers an electrical signal to an analog-to-digital converter which is connected to the data bus of the microprocessor controlling the central unit UC. Depending on the desired gain "M" requested by the microprocessor, a digital code is applied to the voltage-controlled power supply which biases the photodiode.

We claim:

1. A method of determining the distance between two points comprising the steps consisting in emitting oscillator modulated electromagnetic radiation from a first point towards a second point, in reflecting the said electromagnetic radiation from the second point back towards the first point, in receiving the reflected electromagnetic radiation at the first point by means of a receiver, in comparing the phase of a first signal derived from the receiver and of a second signal derived from the emission modulation, and in generating phase samples $\phi_i$ representative of the phase difference between the first and second signals, the improvement wherein the method further includes the following steps:

(i) in generating a signal representative of the instantaneous variance $V(\phi_i)$ of the phase samples $\phi_i$;
   (ii) in generating as an estimation of the phase an intermediate signal derived from the average $\hat{\phi}_E$ of $\underline{n}$ phase samples $\phi_i$ weighted by their instantaneous variance;
   (iii) in generating a useful signal representative of the value of the distance D on the basis of the phase estimation $\hat{\phi}_E$; and
   (iv) in displaying this distance value.

2. A method of determining the distance between two points according to claim 1, wherein the the components of the signal detection chain are designed in such a manner that the range of signal amplitude variation passed without distortion by the analog signals covers the width of the distribution function of the received signal amplitudes, i.e. a range of four to six times the standard deviation $\sigma_s$ of the signal.

3. A method of determining the distance between two points according to claim 1, wherein the equivalent passband $\Delta\nu_2$ of the filters of the signal detection circuits is greater than the turbulance spectrum width $\Delta F$.

4. A method of determining the distance between two points according to claim 1, wherein the above-mentioned step (ii) is performed by taking as the value representative of the instantaneous variance of the phase samples, a signal which is proportional to the inverse of the square of the value of the noisy signal under consideration over a passband which is slightly larger than or equal to the turbulance spectrum width.

5. A method of determining the distance between two points according to claim 1, wherein the above mentioned step (i) is performed by means of a detection chain which takes a set of $\underline{n}_e$ samples at a rate $\underline{n}_e$ times greater than the rate at which the $\underline{n}$ phase samples $\phi_i$ are taken.

6. A method of determining the distance between two points according to claim 1, further comprising a preliminary step consisting in controlling an optical attenuator inserted on the propagation path of the electromagnetic radiation in such a manner than the average $\mu_s$ of the received signal S is less than the upper limit of the signal which can be received without distortion (h) by a factor of $k_4$ times the standard deviation $\sigma_s$, where $k_4$ lies in the range 1 to 2.

7. A method of determining the distance between two points according to claim 1, includes the steps of:
   (a) measuring the r.m.s. noise value $N_A$;
   (b) generating a signal representative of the average $\mu_s$ and the standard deviation $\sigma_s$ of the signal on the basis of a collection of samples $y_i$ of the signal (in decibels) together with the value of the attenuation $A_J$ (in decibels) applied to the radiation; and
   (c) generating a signal representative of an estimate of the phase variance $V(\hat{\phi}_E)$ given the r.m.s. noise value, the average $\sigma_s$ and the standard deviation $\sigma_s$.

8. A method of determining the distance between two points according to claim 7, wherein the method comprises the steps consisting in generating a signal representative of an evaluation of the standard deviation of the distance $\hat{\sigma}_{1D}$ proportional to the square root of the phase variance estimation $\overline{V(\phi_E)}$, and in displaying the standard deviation.

9. A method of determining the distance between two points according to claim 8, comprising a further step consisting in increasing the gain M of the receiver in increments until one of the three following conditions is satisfied:
   (1) receiver bias is optimized;
   (2) the gain M has reached its maximum permitted value; and
   (3) the average $\mu_s$ of the signal has reached an optimum value corresponding to the upper limit of the signal which can be admitted without distortion (h) as reduced by $k_4$ times the standard deviation $\sigma_s$, where $k_4$ lies in the range 1 to 2.

10. A method of determining the distance between two points according to claim 9, wherein the receiver is an avalanche photodiode and the above-mentioned condition (1) is obtained when the noise $N_A$ under ambient lighting is about twice the noise $N_O$ from the amplifiers.

11. A method of determining the distance between two points according to claim 9, wherein the generation of the signals representative respectively of the estimation of the phase variance $\overline{V(\phi_E)}$ and of the standard deviation of the distance $\sigma_D$ deduced therefrom, together with the display of the standard deviation of the distance is reiterated after adjusting the gain M of the receiver.

12. A method of determining the distance between two points according to claim 1, wherein steps (i) to (iii) are continued until the standard deviation $\sigma_D$ of the distance is less than a predetermined maximum value $(\sigma_D)_M$ thus increasing the number $\underline{n}$ of samples taken and improving the accuracy of the measurement.

13. A telemeter for performing the method according to claim 1, wherein the telemeter comprises:
   transmitter means associated with an oscillator suitable for emitting modulated electromagnetic radiation towards an observation point;
   receiver means suitable for detecting the electromagnetic radiation after reflection at the said observation point;
   comparator means suitable for comparing the phase of a first signal derived from the receiver and of a second signal derived from the emitted modulation, in order to generate phase samples $\phi_i$ representative of the phase difference between the first and second signals;
   the improvement wherein the telemeter further includes:
   means suitable for generating a signal representative of the value of the instantaneous variance $V(\phi_i)$ of the phase samples $\phi_i$;
   processor means suitable for generating an intermediate signal derived from the average $\hat{\phi}_E$ of n phase samples $\phi_i$ weighted by the said value representative of their instantaneous variance;
   means suitable for generating a useful signal representative of the distance travelled by the electromagnetic radiation between the transmitter means and the receiver means on the base of the said intermediate signal derived from the weighted average $\hat{\phi}_E$; and
   display means responsive to the useful signal and adapted to display data representative of the distance travelled by the radiation.

14. A telemeter according to claim 13, wherein the components of the signal chain are designed in such a manner that the range of signal amplitude variation passed without distortion by the analog signals covers the width of the distribution function of the received signal amplitudes, i.e. a range of four to six times the standard deviation $\sigma_s$ of the signal.

15. A telemeter according to claim 13, wherein the equivalent passband $\Delta\nu_2$ of the filters of the signal detection circuits is greater than the turbulance spectrum width $\Delta F$.

16. A telemeter according to claim 13, wherein the means suitable for generating a signal representative of the value of the instantaneous variance comprises means sensitive to the value of the noisy signal under consideration in a passband which is slightly wider than or equal to the turbulance spectrum width.

17. A telemeter according to claim 13, wherein the processor means are adapted to generate a signal representative of the estimated average of the phase $\hat{\phi}_E$ on the basis of the equation:

$$\hat{\phi}_E = \frac{\sum_{i=1}^{n} \phi_i Y_{i\Delta\nu2}^2}{\sum_{i=1}^{n} Y_{i\Delta\nu2}^2} \quad (5)$$

where $\phi_i$ represents phase samples and $Y_{i\Delta\nu2}$ represents the value of the noisy signal from a recursive filter having bandwidth $\Delta\nu_2$.

18. A telemeter according to claim 13, comprising a first detection chain for taking the phase samples $\phi_i$ and a second detection chain suitable for taking a set of $\underline{ne}$ samples at a sampling rate which is $\underline{ne}$ times greater than the rate at which the $\underline{n}$ phase samples $\phi_i$ are taken, for the purpose of determining their instantaneous variance $V(\phi_i)$.

19. A telemeter according to claim 13, further comprising:
an optical attenuator comprising a plurality of filters inserted on the propagation path of the electromagnetic radiation; and
control means responsive to the average $\mu_s$ of the received signal S and suitable for controlling the positioning of the attenuator in such a manner than the said average is kept below the upper limit of the signal which can admitted without distortion by a factor of $k_4$ times the standard deviation $\sigma_s$, where $k_4$ lies in the range 1 to 2.

20. A telemeter according to claim 13, comprising:
means for generating a signal representative of the r.m.s. value of the ambient noise $N_A$;
means for generating signals representative of the average $\mu_s$ and of the standard deviation $\sigma_s$ of the signal expressed dB;
means suitable for generating a signal representative of the estimated variance of the phase on the basis of the equation:

$$\widehat{V(\phi_E)} = \frac{k_2 N_A^2}{t_m} \frac{e^{-2a(\mu_s + a\sigma_s^2)}}{F\left[\dfrac{h - \mu_s - 2a\sigma_s^2}{\sigma_s}\right]} \quad (6)$$

in which $k_2$ and $\underline{a}$ are constants, $t_m$ represents the measurement time, the notation $F[\ ]$ represents the normal law distribution function of the centered and reduced variable, and $\underline{h}$ designates the upper limit of the signal which can be admitted without distortion; and
means sensitive to the said signal and suitable for displaying the estimated phase variance.

21. A telemeter according to claim 20, further comprising: an optical attenuator comprising a plurality of filters inserted on the propagation path of the electromagnetic radiation, and the means suitable for generating signals representative of the average $\mu_s$ and the standard deviation $\sigma_s$ of the signal expressed in dB are adapted to generate signals which correspond respectively to:

$$\mu_s = \frac{1}{P} \sum_{i=1}^{p} (A_j + y_i) \quad (7)$$

and $$\sigma_s = \sqrt{\frac{1}{P} \sum_{i=1}^{p} (A_j + y_i)^2 - \mu_s^2} \quad (8)$$

in which equation $y_i$ represents the signal samples expressed in dB and $A_j$ represents the attenuation of the signal due to the attenuator as associated with respective samples $y_i$, while $\underline{p}$ represents the total number of samples taken into consideration.

22. A telemeter according to claim 13, including:
means for receiving the $\underline{m}$ noise samples $X_i$ and for generating a signal representative of the r.m.s. value of the ambient noise $N_A$ such that $$N_A^2 = \frac{1}{m} \sum_{i=1}^{m} X_i^2 \quad (16)$$

means suitable for generating a signal representative of the variance in the estimated phase on the basis of the equation:

$$V(\hat{\phi}_E) = \frac{k_2 N_A^2}{t_m \sum_{i=1}^{n} Y_{i\Delta\nu2}^2} \text{ where} \quad (30)$$

$k_2$ is a constant $Y_{i\Delta\nu2}$ represents the samples of the noisy signal and $t_m$ represents the sampling time thereof; and
means suitable for displaying information derived from the variance of the estimated phase $V(\hat{\phi}_E)$.

23. A telemeter according to claim 20, further comprising:
means suitable for generating a signal representative of an evaluation of the standard deviation of the distance $\sigma_D$ proportional to the square route of the estimation of the phase variance $\overline{V(\phi_E)}$, or $V(\hat{\phi}_E)$; and
means suitable for displaying the standard deviation of the distance $\sigma_D$.

24. A telemeter according to claim 13, further including:
means suitable for controlling incremental increases in the gain M of the receiver until one of the three following conditions is satisfied:
(1) the receiver bias is optimized;
(2) the gain M has reached its maximum permitted value; and
(3) the average of the signal $\mu_s$ has reached an optimum value corresponding to the upper limit of the signal admitted without distortion (h) as reduced by a factor of $k_4$ times the standard deviation $\sigma_s$, where $k_4$ lies in the range 1 to 2.

25. A telemeter according to claim 24, wherein the receiver is an avalanche photodiode and the above-mentioned condition (1) is obtained when the ambient noise $N_A$ is about twice the amplifier noise $N_O$.

26. A telemeter according to claim 23, comprising means suitable for comparing the estimated standard deviation on the distance $\sigma_1 D$ with a predetermined maximum value $(\sigma_D)_M$ to control an adjustment of the gain M when the estimated standard deviation $\sigma_{1D}$ is greater than the maximum value $(\sigma_D)_M$.

27. A telemeter according to claim 13, including means suitable for comparing the standard deviation $\sigma_D$ with a predetermined maximum value to control the accumulation of samples and to improve the accuracy of the measurement for as long as the standard deviation is greater than the said predetermined value.

28. A telemeter according to claim 13, comprising comparator means sensitive to the received signal and adapted to authorize measurement only when the received signal lies between an upper limit $\underline{h}$ of admissible signal level without distortion and a lower threshold $\underline{b}$.

29. A telemeter according to claim 22, further comprising:
means suitable for generating a signal representative of an evaluation of the standard deviation of the distance $\sigma_D$ proportional to the square route of the estimation of the phase variance $\overline{V(\phi_E)}$, or $V(\widehat{\phi}_E)$; and
means suitable for displaying the standard deviation of the distance $\sigma_D$.

30. A telemeter according to claim 29, comprising means suitable for comparing the estimated standard deviation on the distance $\sigma_1 D$ with a predetermined maximum value $(\sigma_D)_M$ to control an adjustment of the gain M when the estimated standard deviation $\sigma_{1D}$ is greater than the maximum value $(\sigma_D)_M$.

* * * * *